US008660387B2

United States Patent
Suzuki et al.

(10) Patent No.: US 8,660,387 B2
(45) Date of Patent: Feb. 25, 2014

(54) ATHERMAL RING OPTICAL MODULATOR

(71) Applicants: Nobuo Suzuki, Kanagawa (JP); Mizunori Ezaki, Kanagawa (JP)

(72) Inventors: Nobuo Suzuki, Kanagawa (JP); Mizunori Ezaki, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/684,740

(22) Filed: Nov. 26, 2012

(65) Prior Publication Data
US 2013/0251300 A1    Sep. 26, 2013

(30) Foreign Application Priority Data
Mar. 26, 2012  (JP) ................. 2012-069860

(51) Int. Cl.
*G02F 1/025* (2006.01)
*G02F 1/035* (2006.01)
*G02B 6/10* (2006.01)

(52) U.S. Cl.
USPC .................. 385/2; 385/8; 385/9; 385/131

(58) Field of Classification Search
USPC .............. 385/2, 8, 9, 27, 30, 129–132
See application file for complete search history.

(56) References Cited

U.S. PATENT DOCUMENTS

| | | | |
|---|---|---|---|
| 6,411,752 B1* | 6/2002 | Little et al. | 385/17 |
| 7,970,244 B2* | 6/2011 | Krug et al. | 385/32 |
| 8,009,937 B2* | 8/2011 | Mathai et al. | 385/2 |
| 8,488,917 B2* | 7/2013 | Manipatruni et al. | 385/2 |
| 2007/0071394 A1 | 3/2007 | Faccio et al. | |
| 2011/0293216 A1* | 12/2011 | Lipson et al. | 385/14 |
| 2012/0057815 A1* | 3/2012 | Ezaki et al. | 385/3 |
| 2012/0243828 A1* | 9/2012 | Suzuki | 385/32 |

OTHER PUBLICATIONS

Payam Alipour et al. "Athermal performance in high-Q polymer-clad silicon microdisk resonators", Optic Letters, vol. 35, No. 20, Oct. 15, 2010, pp. 3462-3464.

* cited by examiner

*Primary Examiner* — Daniel Petkovsek
(74) *Attorney, Agent, or Firm* — Oblon, Spivak, McClelland, Maier & Neustadt, L.L.P.

(57) ABSTRACT

An athermal ring optical modulator includes a first clad layer, a ring optical resonator, a second clad layer, an input-output optical waveguide, a first conduction type region, and a second conduction type region. The ring optical resonator has a rib optical waveguide with a convex portion formed on a semiconductor slab layer. The semiconductor slab layer is formed on the first clad layer. The second clad layer covers an upper side of the rib optical waveguide. The input-output optical waveguide couples optically with the ring optical resonator. The first and second conduction type regions are formed in the semiconductor slab layer inside and outside the ring optical resonator, respectively. In addition, the second clad layer includes a material having a negative thermo-optical coefficient. The semiconductor slab layer outside the convex portion is thinner than the semiconductor slab layer inside the convex portion.

13 Claims, 8 Drawing Sheets

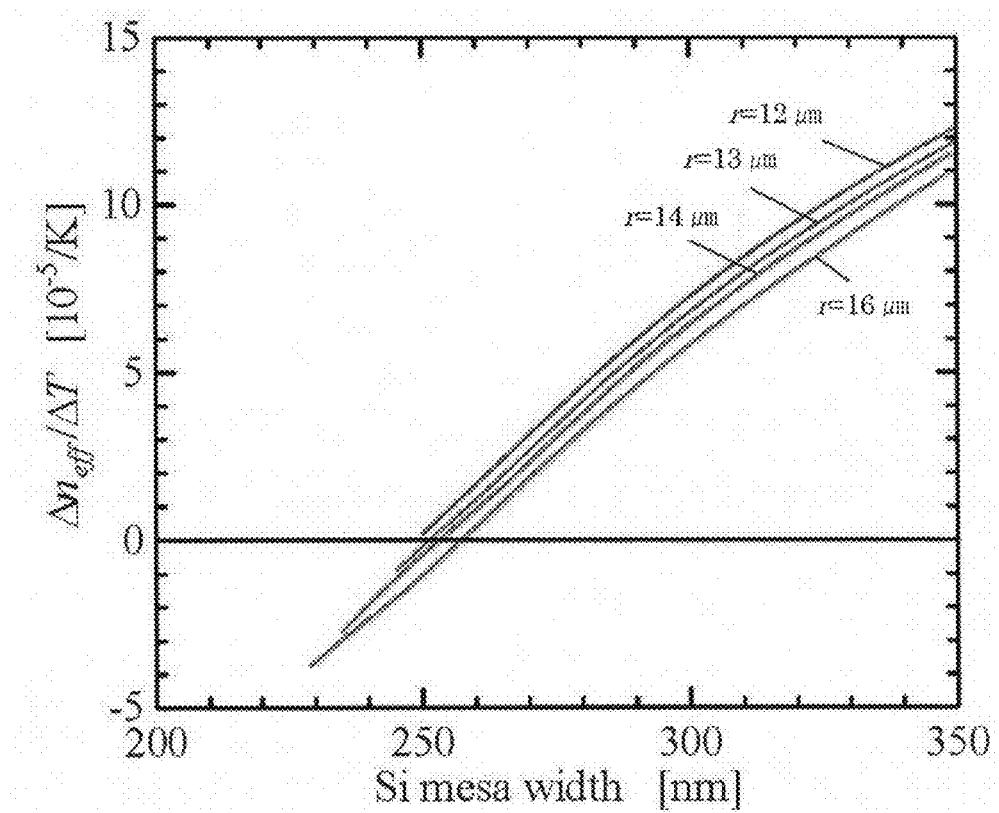
Related Art  FIG. 6

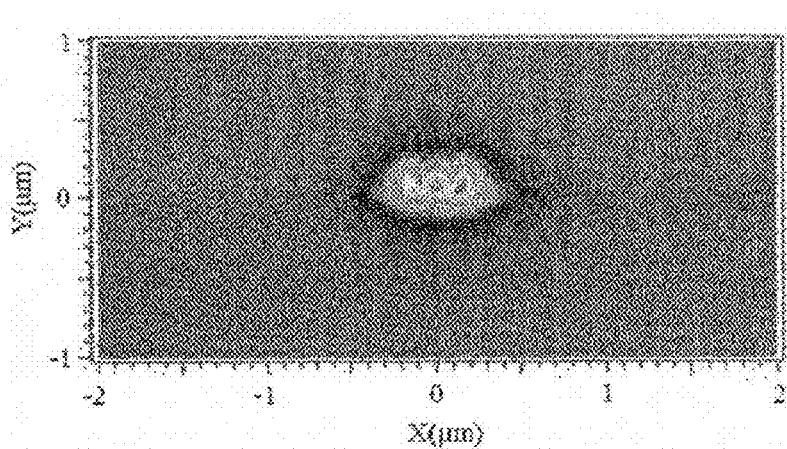
Related Art     FIG. 7A
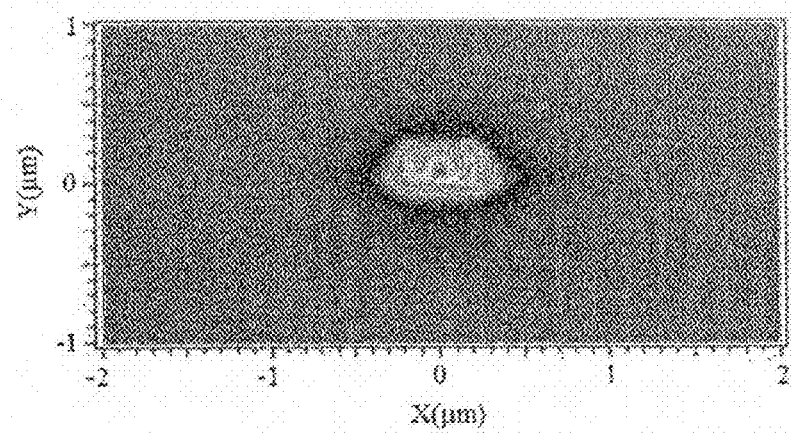
Related Art     FIG. 7B

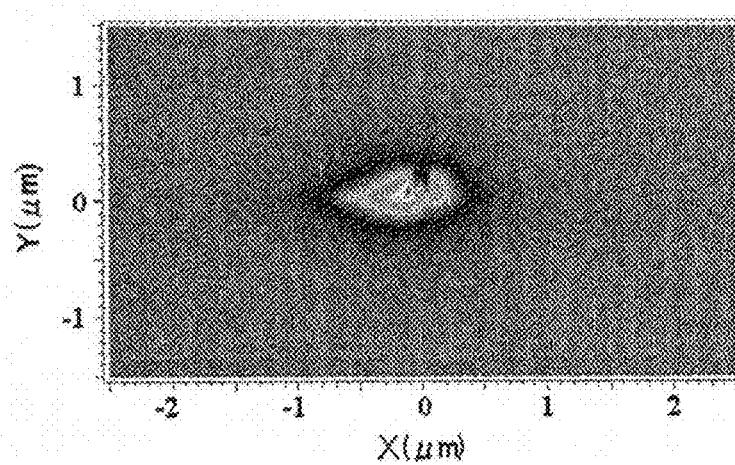
FIG. 8A
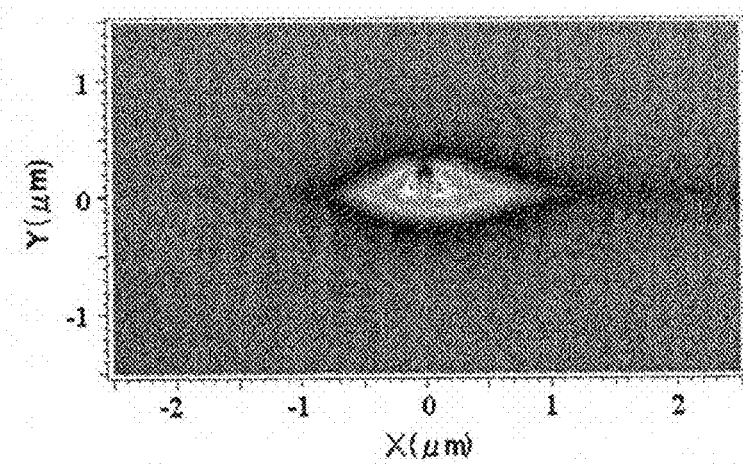
Related Art  FIG. 8B
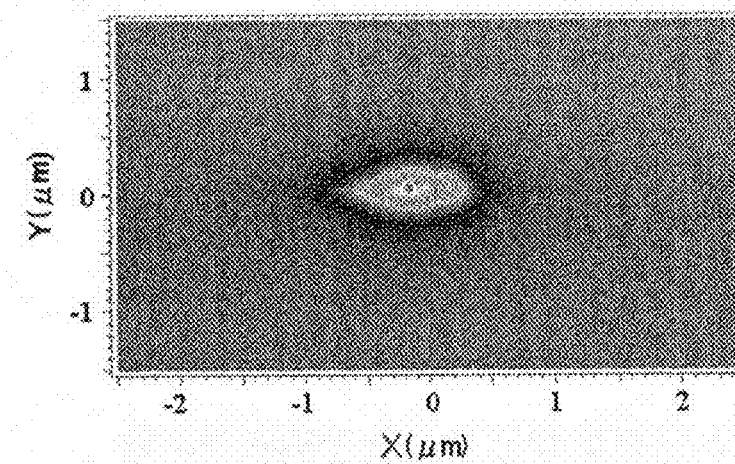
FIG. 8C

ATHERMAL RING OPTICAL MODULATOR

CROSS REFERENCE TO RELATED APPLICATION

This application is based upon and claims the benefit of priority from the prior Japanese Patent Application No. 2012-069860, filed on Mar. 26, 2012, the entire contents of which are incorporated herein by reference.

FIELD

Embodiments relate basically to an athermal ring optical modulator.

BACKGROUND

Si photonic wire waveguides have a large contrast between refractive indexes of a core and its neighborhood. Such waveguides have enabled downsizing of optical devices. The typical cross-section of the Si photonic wire waveguides in the 1.55 μm band measures 220 nm thick by 450 nm wide. Highly sophisticated CMOS process enables it to mass-produce an optical integrated circuit that integrates many fine optoelectronic devices, thereby enabling it not only to prepare optical interconnection among devices or boards, but also to promise large-capacity optical interconnections for inter-chip or intra-chip.

Transmitting and receiving functions need at least to employ the Si photonic wire waveguides for optical interconnections. The application of the waveguides to optical interconnections for inter-chip or intra-chip requires downsizing, low power consumption (high efficiency), and high speed of devices. As for the receiver, waveguide-type Ge- or InGaAs-photodetectors with a length of 5 to 10 μm and a width of several μm are integrated on a Si photonic wire waveguide; and achieve an efficiency of about 1 mA/mW and a frequency band width of several GHz to several tens of GHz. As for the transceiver, it is very difficult to realize a highly-efficient laser with Si with an indirect band gap. Thus, it is common to combine a Si optical modulator with an external light source. The Si optical modulators include an electro-absorption modulator, a Mach-Zehnder modulator, and a ring modulator. The ring modulator is only one ultracompact modulator (its footprint is not more than 100 μm$^2$) thereamong that can be applied to high-capacity optical interconnections.

A ring optical modulator has advantageous properties including compactness, a high efficiency, a high speed, and less return of reflected light. However, its resonance wavelength is very sensitive to the temperature (T), because Si has a positive thermo-optical coefficient, i.e, a positive temperature coefficient dn/dT, as high as +2×10$^{-4}$/K. Mounting a temperature controller onto each ring optical modulator is not acceptable for the application to intra-chip optical interconnections, which has caused a major challenge to achieve an athermal ring modulator.

A passive optical ring filter can be athermalized by employing a polymer with a negative thermo-optical coefficient, i.e., a negative temperature coefficient dn/dT, as a clad material. Most of polymers have a thermo-optical coefficient of −1×10$^{-4}$ to −3×10$^{-4}$/K. Some polymers (polyurethane diacrylate: PUA) have a large negative thermo-optical coefficient of −4.5×10$^{-4}$/K.

The refractive index of Si (3.48 at a wavelength of 1550 nm) is higher than that of polymers (1.4 to 1.6). A considerable amount of light should spread out into the polymer to make the temperature coefficient of the effective refractive index close to zero. In other words, it is required to employ a waveguide with a weak optical confinement. Such a waveguide has a cross-section of Si much smaller than that of the typical non-athermalized Si photonic wire waveguide. Decreasing the radius of the waveguide with a weak optical confinement causes a considerable increase in the radiation loss so that the downsizing has been difficult.

A Si ring optical modulator requires electric connections to inject current or to apply voltage. It is however difficult to provide the electric connections on or under a ring resonator, and is common to compose the ring resonator of a rib waveguide such that electrodes are formed on Si semiconductor slabs inside and outside of the ring resonator. In such a composition, the high refractive index of the Si slab outside the ring resonator causes a high radiation loss, thereby making it much difficult to reduce the radius of the waveguide.

BRIEF DESCRIPTION OF THE DRAWINGS

Aspects of this disclosure will become apparent upon reading the following detailed description and upon reference to the accompanying drawings.

FIG. 6 is a graph showing a relation among the ring radius, the Si mesa width, and the temperature coefficient of the effective refractive index for the fundamental TE mode.

FIGS. 7A and 7B are views showing electric field profiles of the fundamental TE mode.

FIGS. 8A and 8C are views showing electric-field profiles of the fundamental TE modes of Si ring modulators in accordance with the second embodiment. FIG. 8B is a view showing electric-field profile of the fundamental TE mode of a Si ring modulator with 50-nm-thick Si slabs inside and outside the ring resonator.

DESCRIPTION

As will be described later, in accordance with an embodiment, an athermal ring optical modulator includes a first clad layer, a ring optical resonator, a second clad layer, an input-output optical waveguide, a first conduction type region, and a second conduction type region. The ring optical resonator has a rib optical waveguide. The rib optical waveguide has a convex portion formed on a semiconductor slab layer. The semiconductor slab layer is formed on the first clad layer. The second clad layer covers an upper side of the rib optical waveguide. The input-output optical waveguide couples optically with the ring optical resonator. The first conduction type region is formed in the semiconductor slab layer inside the ring optical resonator. The second conduction type region is formed in the semiconductor slab outside the ring optical resonator. In addition, the second clad layer includes a material having a negative thermo-optical coefficient. The semiconductor slab layer outside the convex portion is thinner than the semiconductor slab layer inside the convex portion.

Preferable embodiments will be described more in detail below.

First Embodiment

Figure 1:
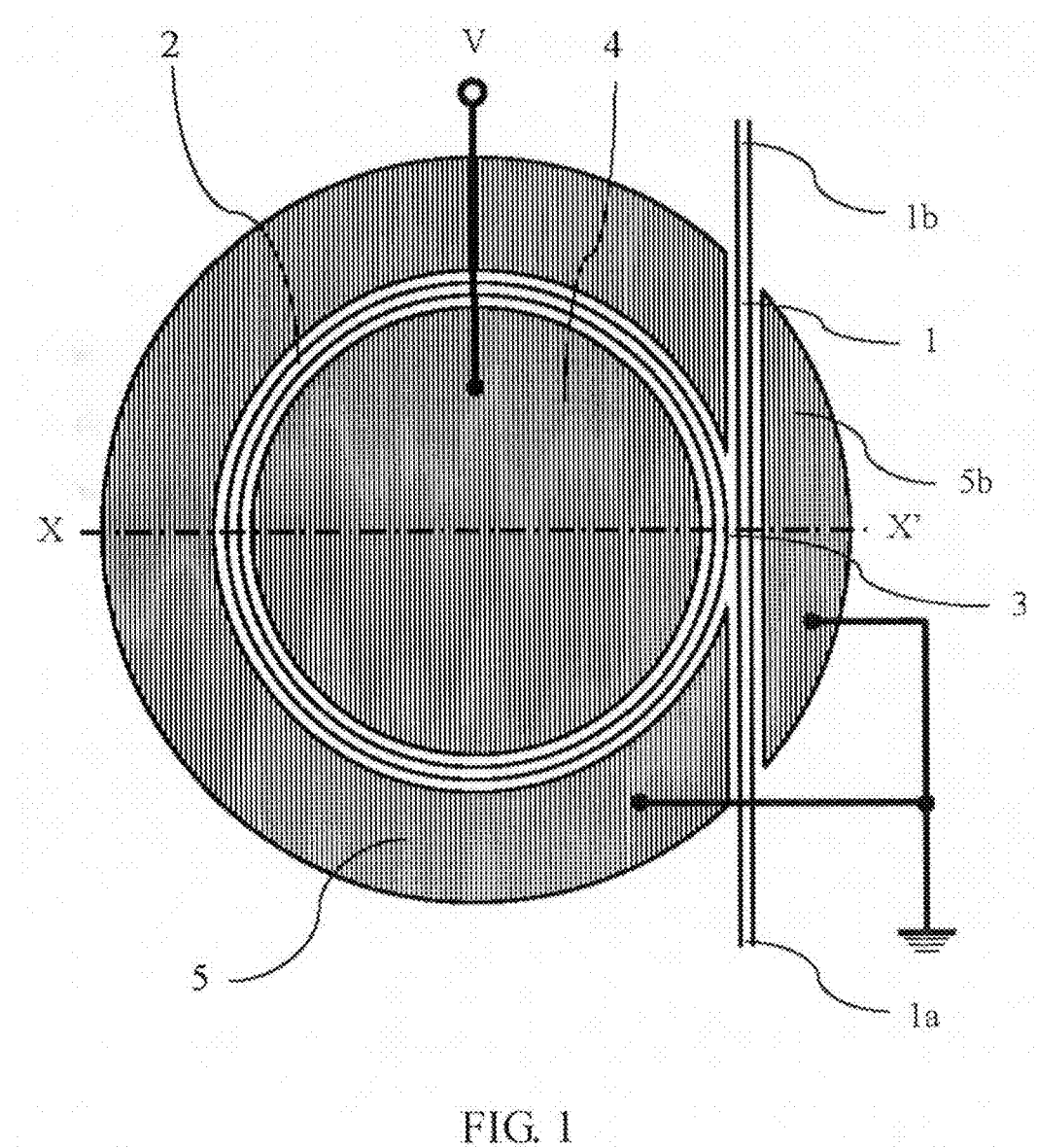
FIG. 1 is a plan view showing a schematic configuration of a Si ring optical modulator in accordance with a first embodiment.

FIG. 1 is a plan view showing a schematic configuration of a Si ring optical modulator in accordance with a first embodiment. The ring optical modulator includes an input-output optical wave guide 1 and an 8 μm-radius ring resonator 2 both being coupled with each other via an optical coupler 3. The gap (distance between the sidewalls of the waveguide 1 and the ring resonator 2) of the optical coupler 3 is 300 nm. Electrodes 4 and 5 are formed inside and outside the ring resonator 2, respectively. A portion 5b of the electrode 5 is formed on the opposite side of the input-output waveguide 1 from the ring resonator 2. The above-mentioned basic configuration is the same as that of the background art.

Figure 2:
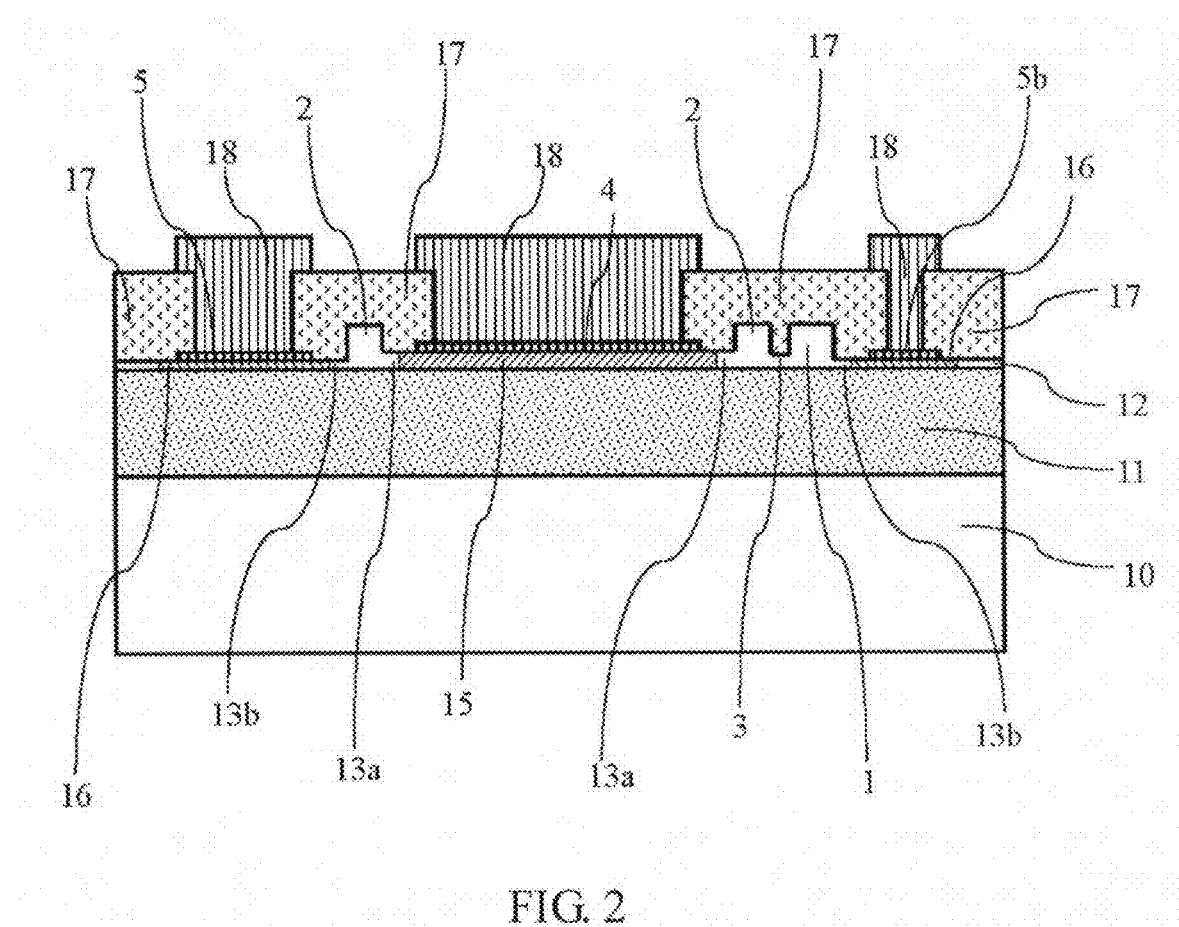
FIG. 2 is a view schematically showing a section taken along the line X-X' in FIG. 1.

FIG. 2 is a view schematically showing a section taken along the line X-X' of the athermal ring optical modulator in accordance with the first embodiment shown in FIG. 1. The line X-X' passes through the center of the ring resonator 2 and the optical coupler 3. A top Si layer 12 is formed on a 3 μm-thick SiO$_2$ layer (a first cladding layer) 11 formed on a Si substrate 10. The input-output waveguide 1 and the ring resonator 2 are formed in the top Si layer 12, each including the rib waveguide having a mesa (convex portion) that is 220 nm in thickness. The input-output waveguide 1 and the ring resonator 2 have mesas that are 450 nm and 210 nm in width, respectively. The semiconductor slab layers 13a and 13b, which are located inside and outside the ring resonator, are 70 nm and 30 nm in thickness, respectively. The semiconductor slab in the gap of the optical coupler 3 becomes thicker gradually as the interval between two waveguides becomes narrower.

A p$^+$ region 15 and an n$^+$ region 16 are formed in the semiconductor slabs 13a and 13b inside and outside the ring resonator 2, respectively. Silicide electrodes 4 and 5 are formed on the p$^+$ region 15 and the n$^+$ region 16, respectively. Any region of the top Si layer 12 other than the regions 15 and 16 is kept to be intrinsic without intentional impurity doping. The upper portions of the input-output waveguide 1 and the rib waveguide of the ring resonator 2 are covered with a polymer 17 (the second clad layer, the upper clad layer) including polyurethane diacrylate (PUA). The silicide electrodes 4 and 5 are electrically connected to external circuitry via metal interconnections 18 formed at openings of the polymer 17.

Figure 3A:
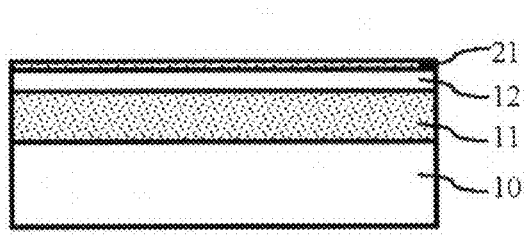
FIGS. 3A to 3J are views exemplifying main manufacturing steps of the ring optical resonator in accordance with the first embodiment.
Figure 3B:
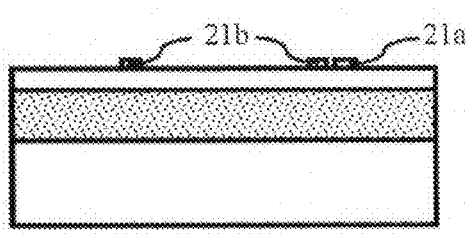

FIGS. 3A to 3J are views exemplifying main manufacturing steps of the ring optical resonator in accordance with the present embodiment. Detailed description will be omitted for steps of manufacturing any parts other than the above parts or essential parts of the disclosure. The ring optical resonator is manufactured using an SOI (Silicon On Insulator) substrate including a Si substrate 10, a SiO$_2$ layer 11, and a top Si layer 12. A SiO$_2$ layer 21 to be used as a processing mask for an optical waveguide is formed by thermally oxidizing the surface of the top Si layer 12 (FIG. 3A). The top Si layer 12 to be left unoxidized is 220 nm in thickness. The SiO$_2$ layer 21 is patterned so that portions for the input-output waveguide 1 and the ring resonator 2, etc. are left; and the rest is removed (FIG. 3B).

Figure 3C:
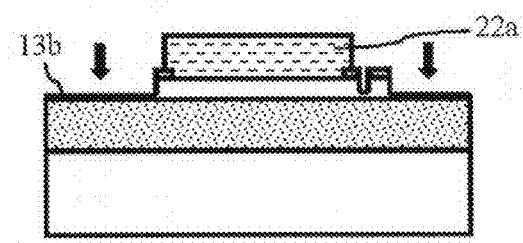
Figure 3D:
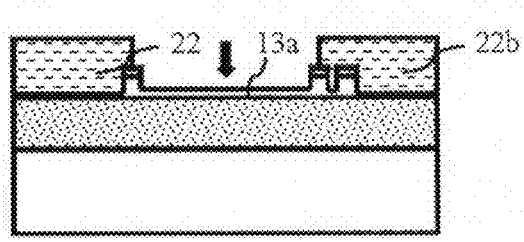
Figure 3E:
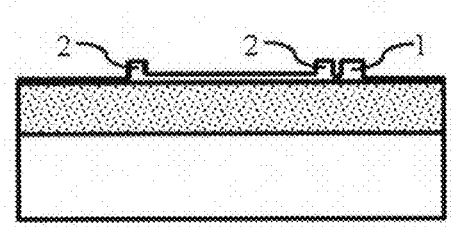
Figure 3F:
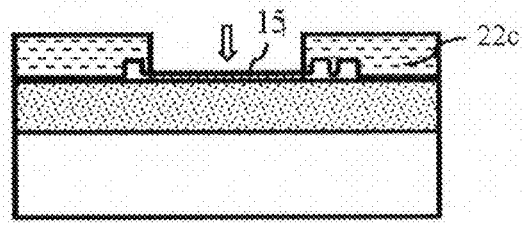
Figure 3G:
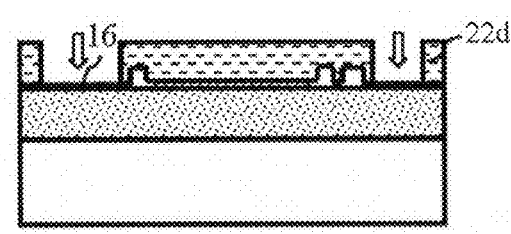

A resist 22a is applied entirely to the resultant SOI substrate and patterned such that the patterned resist 22a covers the surface portion inside the ring resonator. A thickness of 190 nm of the top Si layer 12 is etched using the SiO$_2$ layer 21 and the resist 22a as masks. This etching defines the width of the SiO$_2$ layer 21 as a margin of the edge location of the resist 22a (FIG. 3C). The margin includes recession due to the side etching. After the resist 22a has been removed, a resist 22b are applied again to the resultant SOI substrate and patterned such that the patterned resist 22b covers the outside of the ring resonator 2. The top Si layer 12 is etched by 150 nm using both the SiO$_2$ layer 21 and the resist 22b as masks (FIG. 3D). The SiO$_2$ layer 21 and the resist 22b both having been used for the mask are removed. The above series of etching forms the input-output waveguide 1, the ring resonator 2, the optical coupler 3, the Si semiconductor slab 13a (70 nm in thickness) inside the ring resonator 2, and the Si semiconductor slab 13b (30 nm in thickness) outside the ring resonator 2 (FIG. 3E). Semiconductor slab in the optical coupler that has a small gap between the two waveguides becomes slightly thicker owing to a micro-loading effect.

Figure 3H:
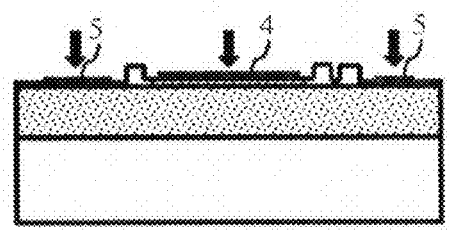
Figure 3I:
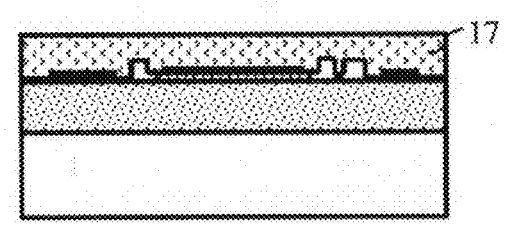
Figure 3J:
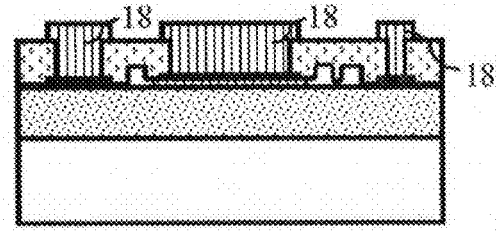

Subsequently, ion implantation of BF$_3$ using a resist 22c as a mask (FIG. 3F), ion implantation of As using a resist 22d as a mask (FIG. 3G), annealing, etc. form the p$^+$ region 15 in the Si semiconductor slab layer 13a inside the ring optical resonator and the n$^+$ region 16 in the Si semiconductor slab layer 13b outside the ring optical resonator. A Ni film is deposited on the p$^+$ region 15 and the n$^+$ region 16; lifted off; and annealed to form a Ni silicide, thereby forming the electrodes 4 and 5 (FIG. 3H). Finally, the photosensitive polymer 17 is applied to the surface of the resultant SOI substrate (FIG. 3I), and openings are made at locations of the electrodes in the photosensitive polymer 17. After the photosensitive polymer 17 is cured, interconnections 18 are formed to complete the ring optical modulator.

The above-described is an example of the manufacturing method that can be modified variously. For example, a SiN layer may be employed instead of the thermally-oxidized SiO$_2$ layer 21. In this case, the resist layers 22a and 22b may be replaced with a double-layer mask of a SiO$_2$ layer and a resist layer. Alternatively, the order of processing the inside and outside of the ring resonator may be changed; and ion species for implantation and electrode materials may be changed or modified variously.

The operation principle of the ring optical modulator in accordance with the present embodiment is the same as that of a ring optical modulator of the background art. Light with a wavelength different from the resonant wavelength $\lambda_p$ enters the optical coupler 3 from the inlet end 1a and is outputted at the outlet end 1b almost without loss. Meanwhile, light with a wavelength near the resonant wavelength $\lambda_p$ is trapped by the ring resonator 2 and attenuates while going around the inside of the ring resonator 2. When the wavelength of the incident light is tuned to one of the resonant wavelengths during no current injection, no light is outputted from outlet end 1b in non-modulation.

Passing a current between the electrodes 4 and 5 changes carrier density N of the optical waveguide included in the ring resonator 2, thereby changing the refractive index thereof. It is known that a change Δn in the refractive index with the carrier density of the Si wave guide is expressed in the following formula [1].

[Formula 1]

$$\Delta n = a_e N_e + a_h N_h^{0.8} \qquad [1]$$

$N_e$ and $N_h$ denote electron density and hole density, respectively. The coefficients $a_e$ and $a_h$ are proportional to the square of the wavelength. Specifically, the coefficients are as $a_e = -8.8 \times 10^{-22}$ cm$^3$ and $a_h = -8.5 \times 10^{-18}$ cm$^{2.4}$ at a wavelength of 1.55 μm. A decrease in the refractive index of the Si waveguide due to the current injection causes the resonant wavelength λp to shift to a shorter wavelength. As a result, the wavelength of the incident light becomes out of the resonant spectrum band so that light is outputted from the outlet end 1b.

Si has a large thermo-optical coefficient do/dT (temperature coefficient of refractive index) of $+2 \times 10^{-4}/K$. Accordingly, the temperature coefficient $\Delta n_{eff}/\Delta T$ of the effective refractive index for the TE mode, in which light goes around the inside of a non-athermal ring optical resonator of the background art, also becomes comparable with the thermo-optical coefficient of Si, e.g., $+2.2 \times 10^{-4}/K$. As a result, a temperature rise of 1° C. brings about a redshift of 0.06 to 0.08 nm to the resonant wavelength. Thus, it has not been possible to stably perform an optical modulation without stabilizing the temperatures of the elements.

In the ring optical modulator of this embodiment, the ring resonator 2 is covered with a polymer (PUA) 17 whose thermo-optical coefficient is $-4.5 \times 10^{-4}/K$, thereby balancing out (athermalizing) the temperature dependence of the effective refractive index. In addition, making the Si semiconductor slab 13b outside the ring resonator 2 thinner than the Si semiconductor slab 13a thereinside allows it to reduce the radiation loss and downsize of the ring optical modulator. Thickening the Si semiconductor slab 13a inside the ring resonator 2 reduces its resistance, thereby allowing it to balance out an increase in serial resistance due to the thinning of the Si semiconductor slab 13b thereoutside to some degree.

Figure 4:
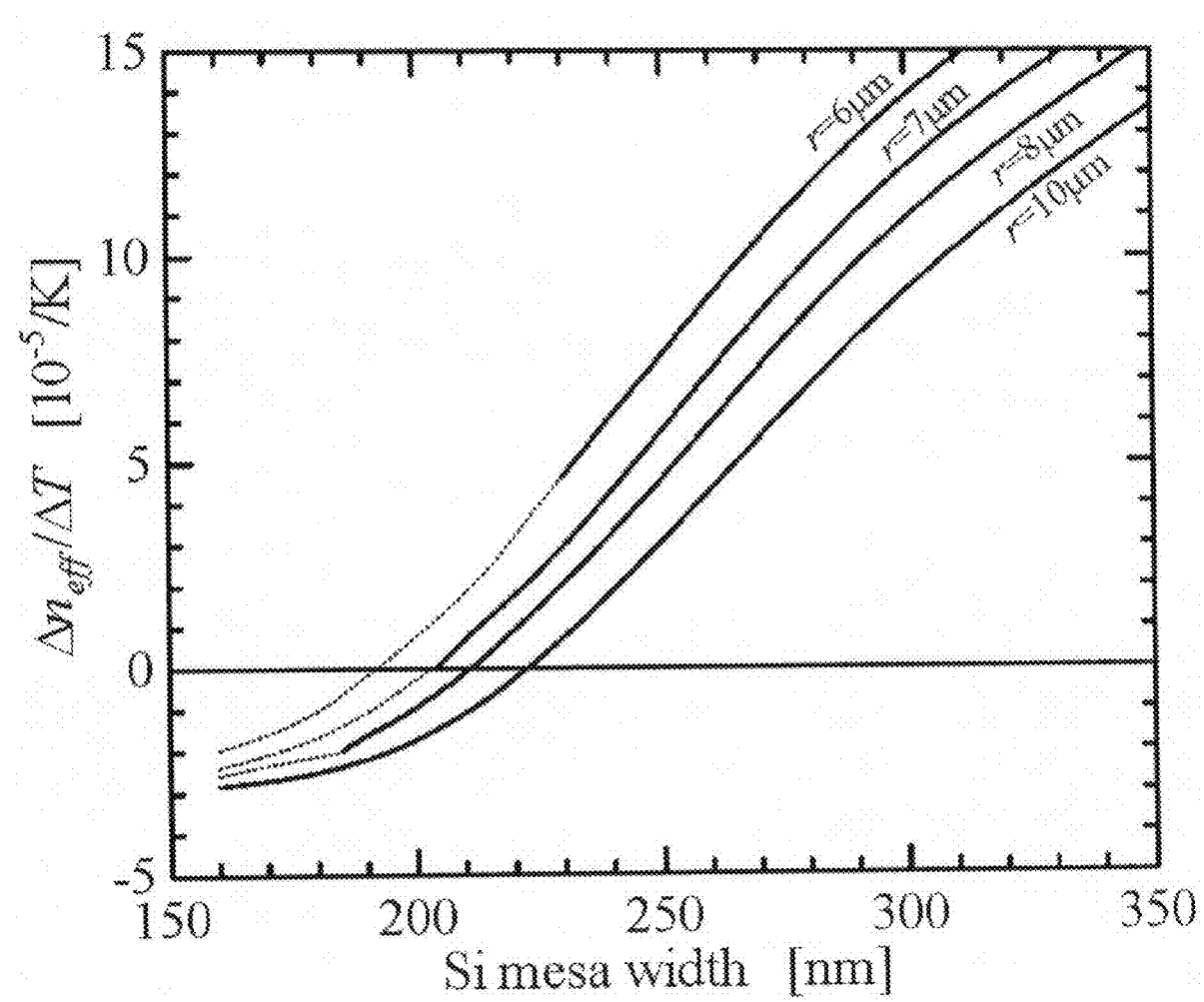
FIG. 4 is a graph showing a computation on the relations among a ring radius, a Si mesa width, and a temperature coefficient of an effective refractive index for the fundamental TE mode.

FIG. 4 is a graph showing a computation on the relations among the ring radius r, the Si mesa width w, and the temperature coefficient $\Delta n_{eff}/\Delta T$ of the effective refractive index $n_{eff}$ in the fundamental TE mode. The refractive indexes of Si, $SiO_2$, and PUA at a wavelength of 1550 nm and a temperature of 20° C. are assumed to be 3.4764, 1.4444, and 1.45, respectively. The thermo-optical coefficient of $SiO_2$ is assumed to be $+1 \times 10^{-5}/K$. The dotted line denotes a range where the influence of radiation on the semiconductor slab layer 13b is notable whereas the solid line denotes a range where the influence of radiation thereon is comparatively small. It is possible to athermalize a ring optical modulator ($|\Delta n_{eff}/\Delta T| < 3.0 \times 10^{-6}/K$) at a Si mesa width of 205 nm, 210 nm, and 225 nm when the ring radii are 7 μm, 8 μm, and 10 μm, respectively.

Figure 5A:
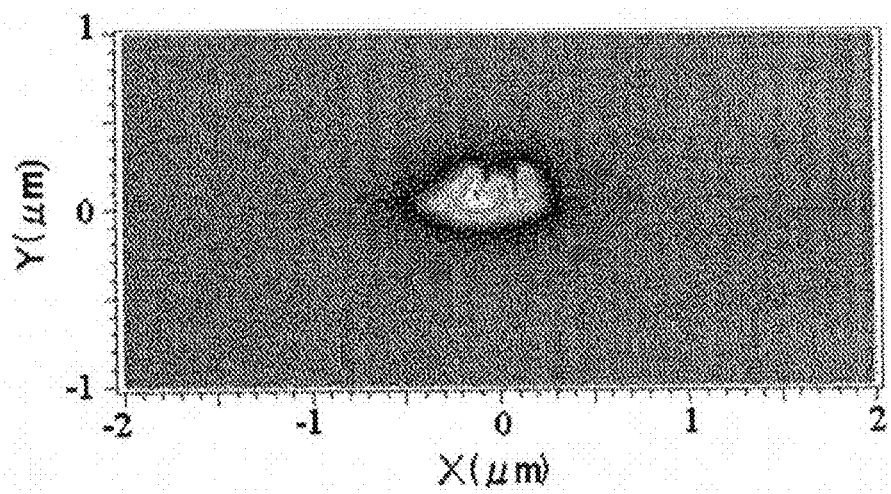
FIGS. 5A and 5B are views showing profiles of fundamental TE modes when the radii and the mesa widths are 7 μm and 205 nm; and 8 μm and 210 nm, respectively.
Figure 5B:
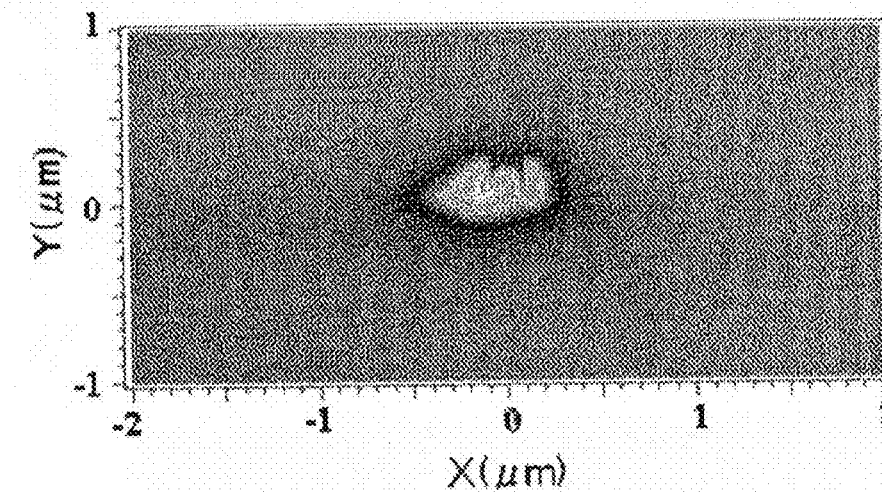

FIGS. 5A and 5B are views showing profiles of the fundamental TE modes when the radii and the mesa widths are 7 μm and 205 nm; and 8 μm and 210 nm, respectively. The right-hand side of each drawing corresponds to the outside of the ring resonator. The ring waveguide is a single mode waveguide whose guiding mode is only a fundamental TE mode. The TM mode of the ring waveguide is coupled with a radiation mode. The thicker semiconductor slab layer 13a inside the ring resonator provides a strongly asymmetric profile of electric field that the electric field distributes eccentrically in the inner side of the mesa. FIG. 5A shows traces of radiation to the semiconductor slab layer 13b whereas FIG. 5B shows almost no radiation thereto. In accordance with the present embodiment, the athermal ring optical modulator can be downsized to a radius of about 8 μm. A slight increase in a radiation loss of the ring resonator shortens a photon lifetime to be advantageous to increasing the speed of the ring optical modulator. Based on this viewpoint, accepting the radiation loss to some degree allows it to apply the present embodiment to an athermal ring optical modulator with a radius of 5 to 7 μm. A mesa width of about 190 nm enables an athermal ring optical modulator with a radius of 6 μm, for example.

For comparison, a ring optical modulator where both thicknesses of semiconductor slabs inside and outside its ring resonator are 50 nm is evaluated for a relation among the ring radius r, the Si mesa width w, and the temperature coefficient $\Delta n_{eff}/\Delta T$ of the effective refractive index $n_{eff}$ in the fundamental TE mode. FIG. 6 is a graph showing the relation. Data points of $\Delta n_{eff}/\Delta T$ in a range where radiation to the semiconductor slab thereoutside is predominant (corresponding to the range shown with dotted lines in FIG. 4) have been scattered and not been on a clear curve. The data points are therefore removed from the drawing. A minimum radius that allows it to be athermalized is 12 μm in a range where the wave guide mode hardly couples with the radiation mode. The ring optical modulators having a radius of not more than 14 μm and a radius of 16 μm are athermalized around at mesa widths of 250 nm and 260 nm, respectively.

FIGS. 7A and 7B are views showing electric field profiles of the fundamental TE mode at a radius of 12 μm and a mesa width of 250 nm; and at a radius of 16 μm and a mesa width of 260 nm, respectively. The right-hand sides correspond to the outside of the ring optical modulator in the same way as in FIGS. 5A and 5B. No conspicuous asymmetry similar to those in FIGS. 5A and 5B is seen because the semiconductor slabs have the same thickness inside and outside the ring resonator. FIG. 7A clearly shows coupling with a radiation mode. The coupling with the radiation mode gradually weakens with increasing the radius. Also in FIG. 7B, the electric field profile tails off toward the outside so that the electric field profile is affected by the $n^+$ region 16 or the electrode 5.

As described above, the present embodiment enables a low radiation-loss athermal ring optical modulator with a radius of 8 μm. Meanwhile, when the athermal ring optical modulator has the semiconductor slab layers with the same thickness inside and outside the ring resonator, a low radiation-loss athermal ring optical modulator cannot be achieved without making the radius 16 μm or more. In other words, the ring resonator of the present embodiment enables it to reduce the footprint to a quarter of the ring resonator having the same thickness of the symmetric semiconductor slab layers.

A decrease in the optical confinement to the Si layer reduces the modulation efficiency of the athermal ring optical modulator to as much as half that of the non-athermal optical modulator. The decrease is however acceptable because a ring optical modulator is intrinsically highly-efficient with low power consumption. Downsizing optical elements offers not only an advantage of high integration density but also other various advantages such as a reduction in power consumption and expansion of modulation-frequency bands, etc. When the athermal ring optical modulator is to be applied to on-chip optical interconnections, both the athermalizing and downsizing of the optical elements in accordance with the present embodiment will outweigh the decrease in the modulation efficiency of the elements.

The present embodiment can be applied not only to the above-described carrier-injection type Si ring optical modulator but also to a depletion type Si ring optical modulator. In the depletion type Si ring optical modulator, a pn junction is formed near the mesa section of an optical waveguide included in a ring optical resonator, and a doping profile is regulated such that the mesa section has a carrier density of about $4 \times 10^{17}$ $cm^{-3}$. Applying a reverse voltage to the pn junction depletes carriers in the mesa section, which causes a red shift of the resonant wavelength.

The depletion type Si ring optical modulator has modulation characteristics (modulation voltage, modulation efficiency, modulation speed, modulation power, extinction ratio, and insertion loss, etc.) different from those in the current injection type Si ring modulator. Even in such a depletion type Si ring optical modulator, however, the mechanism and effect of the present embodiment are the same as those in the above-described current injection type Si ring optical modulator.

In addition to the above-described, the present embodiment can be variously modified or applied without departure from the scope of the disclosure. For example, the waveguide portion of the Si layer 12 may include a low loss amorphous Si (a-Si); and the $p^+$ and $n^+$ regions may include poly silicon. By means of the laser annealing, the $p^+$ and $n^+$ regions can be locally poly-crystallized and the electrodes can be locally annealed. In this case, a Si athermal ring optical modulator can be manufactured with a backend process, thereby allowing manufacturing costs to be lower and bringing about more flexibility to the arrangement of electrical and optical elements than when an SOI substrate is used.

When a-Si is employed for the optical waveguide, materials including Ti oxide with a negative thermo-optical coefficient can be employed also for the first clad (lower clad). Amorphous $SrTiO_3$ (a-STO) is an isotropic material with a low optical loss whose refractive index and thermo-optical coefficient are 1.95 and $-2 \times 10^{-5}$/K, respectively. The a-STO contributes to temperature compensation less than polymer. Nevertheless, the Si mesa width to athermalize the ring modulator becomes slightly wider, when a-STO is used as the lower clad material instead of $SiO_2$ with a positive thermo-optical coefficient of about $+1 \times 10^{-5}$/K. It is effective for downsizing and enhancing the modulation efficiency.

In the present embodiment, the input-output waveguide 1 has a mesa width of 450 nm, which is wider than the mesa of the ring resonator 2. Narrowing the mesa width of the input-output waveguide 1 to be closer to the mesa width of the ring resonator reduces a difference between the effective refractive indexes of the waveguide 1 and the resonator 2, thereby raising the power coupling ratio at the same gap width. Narrowing the mesa width of the waveguide 1 near the optical coupler 3 and expanding the gap enable it to prevent a change in the thicknesses of the semiconductor slabs in the gap owing to a micro-loading effect, making it easy to control the power coupling ratio of the optical coupler 3.

In addition, when a portion of the input-output waveguide 1 apart from the ring optical modulator is not covered with polymer, keeping the width of the input-output waveguide 1 narrow will possibly cause a reflection at a discontinuous point due to the presence or absence of the polymer. It is preferred in this case that the input-output waveguide 1 is formed in a tapered shape to expand the width of the waveguide 1 from the optical coupler 3 toward the input-output terminals so that most of light is confined in the Si core at the edge of the polymer.

Second Embodiment

An athermal ring optical modulator of a second embodiment fundamentally has the same configuration as that of the first embodiment. Meanwhile, the second embodiment employs common polymer having a refractive index of 1.49 and a thermo-optical coefficient of $-1.8 \times 10^{-4}$/K instead of PUA as the second clad. Both the input-output waveguide 1 and the ring resonator 2 are 220 nm in thickness. The Si semiconductor slab layers 13a and 13b inside and outside are 25 nm and 75 nm in thickness, respectively. A small absolute value of the thermo-optical coefficient of polymer will never cause the temperature coefficient of the effective refractive index to be negative even if the mesa width of the optical waveguide included in the ring resonator is narrowed. Narrowing down the mesa to a range of 150 to 170 nm, however, allows the value $\Delta n_{eff}/\Delta T$ to be $+3.0 \times 10^{-6}$/K or less, i.e., substantially allows athermalizing.

The athermal ring optical modulator of the present embodiment confines light more weakly than that of the first embodiment, being required to have a minimum radius of 16 µm for preventing conspicuous coupling with the radiation mode. FIG. 8A is a view showing an electric-field profile at a ring radius of 20 µm and at a mesa width of 160 nm. The view shows weak coupling with the radiation mode, the coupling having minor influence.

For comparison, another electric profile is computed when both the Si semiconductor slabs inside and outside the ring resonator are 50 nm in thickness. FIG. 8B is a view showing an electric-field profile at a ring radius of 100 µm and at a mesa width of 150 nm. The view reveals that expanding the radius up to 100 µm still causes conspicuous coupling with the semiconductor slab outside the ring resonator.

The present embodiment can be variously modified and applied as well as the first embodiment. The ring resonator can be downsized to have a radius of about 20 µm also by reducing the mesa to 160 nm in thickness and reducing the waveguide to 250 nm in width, under conditions that the semiconductor slabs inside and outside the ring resonator are maintained to be 25 nm and 75 nm in thickness, respectively. FIG. 8C is a view showing an electric-field profile when the ring radius and the mesa width are 20 µm and 250 nm, respectively.

The ring resonator can be downsized to have a radius of 30 µm when the semiconductor slabs inside and outside the ring resonator are made to be 35 nm and 65 nm in thickness, respectively, i.e., to have a reduced difference between the two thicknesses.

Differentiating the thicknesses of the semiconductor slabs inside and outside the ring resonator from each other enables it to downsize the athermal ring optical modulator more easily than making the thicknesses thereof equal to each other. In the second embodiment, the athermal ring optical modulator employs polymer whose absolute value of the thermo-optical coefficient is not so large. The modulation efficiency of the athermal ring optical modulator is as much as one third of that of non-athermal ring optical modulator.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An athermal ring optical modulator, comprising:
   a first clad layer;
   a ring optical resonator having a rib optical waveguide, the rib optical waveguide having a convex portion formed on a semiconductor slab layer, the semiconductor slab layer being formed on the first clad layer;
   a second clad layer covering an upper side of the rib optical waveguide;
   an input-output optical waveguide coupling optically with the ring optical resonator;
   a first conduction type region formed in the semiconductor slab layer inside the ring optical resonator; and
   a second conduction type region formed in the semiconductor slab outside the ring optical resonator, wherein
the second clad layer includes a material having a negative thermo-optical coefficient; and
the semiconductor slab layer outside the convex portion is thinner than the semiconductor slab layer inside the convex portion.

2. The athermal ring optical modulator according to claim 1, wherein the rib optical waveguide has a single TE mode.

3. The athermal ring optical modulator according to claim 1, wherein
the second clad layer includes a polymer having a negative thermo-optical coefficient.

4. The athermal ring optical modulator according to claim 3, wherein
the polymer consists mainly of polyurethane diacrylate.

5. The athermal ring optical modulator according to claim 1, wherein
the semiconductor slab layer outside the convex portion is 30 nm or less in thickness.

6. The athermal ring optical modulator according to claim 1, wherein
a thickness of the semiconductor slab layer outside the convex portion is less than half a thickness of the semiconductor slab layer inside the convex portion.

7. The athermal ring optical modulator according to claim 1, wherein
a radius of the ring optical resonator is 10 μm or less.

8. The athermal ring optical modulator according to claim 1, wherein
the semiconductor slab layer outside the convex portion is thicker in a coupling area where the ring optical resonator and the input-output optical waveguide are close to each other than in other area excluding the coupling area.

9. The athermal ring optical modulator according to claim 1, wherein
the rib optical waveguide having a convex portion formed on a semiconductor slab layer includes silicon.

10. The athermal ring optical modulator according to claim 1, wherein
the convex portion formed on the semiconductor slab layer includes amorphous silicon.

11. The athermal ring optical modulator according to claim 1, wherein
the first conduction type region and the second conduction type region of the semiconductor slab layer include poly silicon.

12. The athermal ring optical modulator according to claim 1, wherein
the first clad layer includes a material having a negative thermo-optical coefficient.

13. The athermal ring optical modulator according to claim 12, wherein
the material included in the first clad layer consists of an oxide including Ti as one of the main elements.

* * * * *